United States Patent [19]

Trepanier et al.

[11] 3,919,215
[45] Nov. 11, 1975

[54] 3-(2-ACYLAMINOPHENYL)-1,2,4-TRIAZINES
[75] Inventors: Donald L. Trepanier; Shyam Sunder, both of Midland, Mich.
[73] Assignee: The Dow Chemical Company, Midland, Mich.
[22] Filed: Nov. 4, 1974
[21] Appl. No.: 520,575

[52] U.S. Cl. .......................... 260/248 AS; 424/249
[51] Int. Cl.² ........................................ C07D 253/06
[58] Field of Search ............................. 260/248 AS

[56] References Cited
UNITED STATES PATENTS
3,873,543  3/1975  Berenyi et al.................... 260/248

*Primary Examiner*—John M. Ford
*Attorney, Agent, or Firm*—Maynard R. Johnson

[57] ABSTRACT 3-(2-Acylaminophenyl)-1,2,4-triazine compounds such as 3-[2-(3,4-dichlorobenzoyl)aminophenyl]-1,4,5,6-tetrahydro-1-ethyl-1,2,4-triazine are prepared by the reaction of a 3-(2-aminophenyl)-4-loweralkyl-1,4,5,6-tetrahydro-1,2,4-triazine with an acid chloride. The compounds are intermediates for preparing triazinoquinazolines having pharmacological activity.

4 Claims, No Drawings

3-(2-ACYLAMINOPHENYL)-1,2,4-TRIAZINES

SUMMARY OF THE INVENTION

This invention is concerned with triazine compounds and is particularly directed to 3-(2-acylaminophenyl)-1-loweralkyl-1,4,5,6-tetrahydro-1,2,4-triazine compounds of the formula

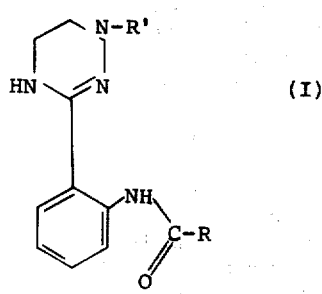

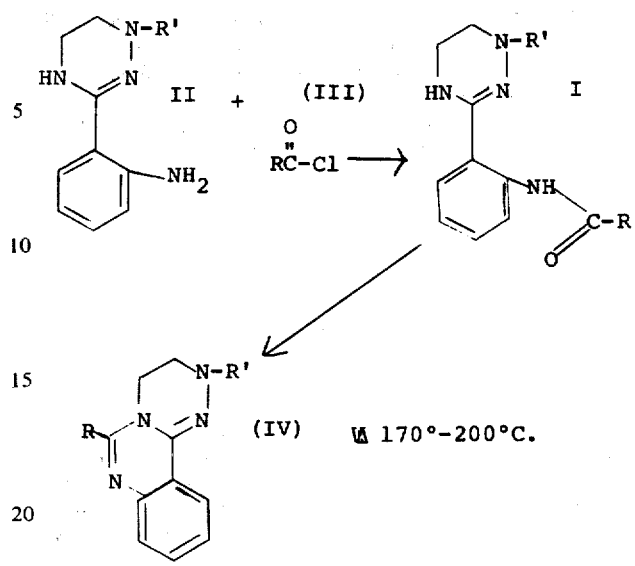

In the above formula, and elsewhere in the present specification, R represents phenyl or substituted phenyl having one, two or three substituents selected from halo, cyano, and lower alkyl or loweralkoxy of one to three carbon atoms, and R' represents loweralkyl of one to three carbon atoms. The compounds are crystalline solids, generally having melting points between about 120° and 200°C., The term "halo" as herein employed refers to fluoro, chloro and bromo.

The triazinoquinazoline compounds prepared from the compounds of the invention are crystalline solids at ordinary temperatures. The triazinoquinazoline compounds have pharmacological activity, and can be administered to animals in the study of chemical effects on the central nervous system and respiratory tract. In particular the compounds can be used as anti-depressants, barbiturate potentiators, analgesics, or histamine antagonists, as indicated by their activity in standard pharmacological evaluation procedures. The type and degree of pharmacological activity typically varies some according to such factors as specific compound employed, dosage rate, dosage route, and size, age and species of animal and effect to be produced. For pharmacological use the compounds wherein R is phenyl or mono-substituted phenyl are particularly preferred.

PREPARATION AND USE OF THE COMPOUNDS

The compounds of the invention are prepared by the reaction of 3-(2-aminophenyl)-1-methyl-1,4,5,6-tetrahydro-1,2,4-triazine (Formula II) with an acid chloride of Formula III to obtain the corresponding 3-(2-acylaminophenyl)-1,4,5,6-tetrahydro-1-methyl-1,2,4-triazine intermediate of Formula I. They are used in a thermal cyclodehydration process to obtain a 6-substituted-3,4-dihydro-2-methyl-2H-1,2,4-triazino[4,3-c]quinazoline of Formula IV.

In the above formulae R has the significance set out above with respect to Formula I.

The reaction of the aminophenyltriazine and the acid chloride proceeds when the reactants are contacted and mixed, in the presence of an inert organic solvent as a reaction medium and a trialkylamine as a hydrogen halide acceptor. Suitable inert solvents include halogenated hydrocarbons and methylene chloride is a preferred solvent. The reaction proceeds at temperatures from about 25° to the boiling temperature of the mixture. It is generally desirable to heat the reaction mixture to the boiling temperature under reflux. The reaction is generally complete within about 2 to about 12 hours, depending upon temperature and choice of solvent and acid chloride. The acylaminophenyl triazine product can be separated by conventional procedures, such as evaporation of reaction medium or cooling of the reaction mixture to induce crystallization of the compound, followed by filtration. The product can be purified by conventional procedures such as recrystallization and washing.

The exact proportions of the reactants to be employed are not critical, some of the desired product being obtained when the reactants are combined over a wide range of proportions. The reaction consumes the reactants in equimolar proportions and in a preferred procedure, the reactants are employed in proportions from substantially equimolar amounts of each reactant to about 10 percent molar excess of either reactant.

The cyclodehydration of the 3-(2-acylaminophenyl)-1-methyl-1,4,5,6-tetrahydro-1,2,4-triazine is carried out by heating the triazine compound at a temperature of from about 170°-200°C. The reaction is preferably carried out without use of a solvent, and is generally complete in from about 0.5 to about 2 hours. The product can be purified by conventional procedures, such as recrystallization.

In lieu of the above thermal cyclodehydration of the 3-(2-acylaminophenyl)-1-methyl-1,4,5,6-tetrahydro-1,2,4-triazines, compounds of the invention can also be used in a polyphosphoric acid catalyzed cyclodehydration process. The reaction proceeds when the acylaminophenyl triazine and sufficient polyphosphoric acid are contacted and mixed. Generally, a 10 to 20 fold excess by weight of polyphosphoric acid is preferred. The reaction proceeds at temperatures from about 0°C. to about 125°C. or higher, and is generally complete in from about 0.5 to about 3 hours. The triazino[4,3-c]quinazoline product is obtained as a mixture with the corresponding 3,4-dihydro-4-loweralkyl-6-substituted-2H-1,2,4-triazino[2,3-c]quinazoline isomer, corresponding to the formula:

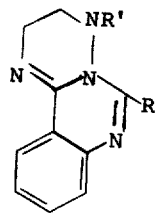

The relative amounts of the isomers can be changed by increasing reaction temperature to increase the concentration of the triazino[4,3-c]quinazoline isomer (formula IV) in the product. The isomers can be separated by conventional procedures such as chromatography on silica gel with an ethyl acetate eluant, and separately purified by conventional procedures.

DESCRIPTION OF PREFERRED EMBODIMENTS

The following examples illustrate the invention but are not to be construed as limiting the same.

EXAMPLE 1

The 3-(2-acylaminophenyl)-1,4,5,6-tetrahydro-1,2,4-triazines listed in Table I below are prepared as follows: 0.1 mole 3-(2-aminophenyl)-1-methyl-1,4,5,6-tetrahydro-1,2,4-triazine is mixed with 15 milliliters triethylamine and 300 milliliters of methylene chloride while a solution of 0.1 mole of the corresponding acid chloride of formula III in a minimal amount of methylene chloride is added dropwise with stirring. When the addition is complete, the reaction mixture is heated, with stirring, at the boiling temperature under reflux for about 6 hours. The mixture is cooled, washed with water, dried over anhydrous magnesium sulfate, and evaporated under reduced pressure to obtain the triazine intermediate. Yields are between 67 and 91 percent of theoretical.

Similarly, 3-[2-(3,4,5-trichlorobenzoylamino)-phenyl]-1-ethyl-1,4,5,6-tetrahydro-1,2,4-triazine, having a molecular weight of 412; and 3-[2-(4-isopropylbenzoylamino)phenyl]-1-n-propyl-1,4,5,6-tetrahydro-1,2,4-triazine, having a molecular weight of 364, are prepared.

EXAMPLE 2

3-(2-Benzoylaminophenyl)-1-methyl-1,4,5,6-tetrahydro-1,2,4-triazine (5.0 grams) is stirred in 65 grams polyphosphoric acid at 100°C. for 1 hour. The mixture is cooled, diluted with ice and water, made alkaline by addition of sodium carbonate, and extracted with chloroform. The chloroform extract is washed with water, dried over anhydrous magnesium sulfate and evaporated under reduced pressure. The residue is passed through a column of 500 grams silica gel 60-200 mesh using ethyl acetate as an eluant. The first product recovered is 3,4-dihydro-2-methyl-6-phenyl-2H-1,2,4-triazino[4,3-c]quinazoline, a yellow crystalline solid melting at 142°–144°C. The second product is the white crystalline solid 3,4-dihydro-4-methyl-6-phenyl-2H-1,2,4-triazino[2,3-c]quinazoline, melting at 206°–207°C. Structure is confirmed by proton magnetic resonance and elemental analysis. The weight ratio of the first named product to the second named product is about 40:60.

The reaction is carried out again at 25°C. instead of 100°C. and the product ratio obtained is 60 parts of the first product to 40 parts of the second. The triazino[2,3-c]quinazoline isomers of the triazino[4,3-b]quinazolines listed in Table II, Example 3, are prepared in substantially the same procedure.

EXAMPLE 3

The compounds listed below in Table II are prepared by heating about 10 grams of the corresponding 3-(2-acylaminophenyl)-1-methyl-1,4,5,6-tetrahydro-1,2,4-triazine prepared as set out in Example 1 in an oil bath at 180°–200°C. for one hour without solvent. After cooling to room temperature, the residue is purified by recrystallization. The compounds correspond to Formula IV wherein R' is methyl.

TABLE I

| R | Melting Point,°C | Elemental Analysis | | | | | |
|---|---|---|---|---|---|---|---|
| | | Calcd. | | | Found | | |
| | | C | H | N | C | H | N |
| $C_6H_5$ | 125–126 | 69.36 | 6.16 | 19.03 | 69.31 | 6.38 | 18.73 |
| 3,4-$Cl_2C_6H_3$ | 162–163 | 56.20 | 4.44 | 15.42 | 56.04 | 4.63 | 15.21 |
| 3-$BrC_6H_4$ | 167–168 | 54.69 | 4.59 | 15.01 | 54.57 | 4.71 | 15.00 |
| 4-$BrC_6H_4$ | 166–167 | 54.69 | 4.59 | 15.01 | 54.50 | 4.62 | 14.91 |
| 4-$O_2NC_6H_4$ | 219–221 | 60.16 | 5.05 | 20.63 | 60.01 | 5.07 | 20.35 |
| 4-$NCC_6H_4$ | 206–208 | 67.69 | 5.36 | 21.93 | 67.71 | 5.25 | 21.68 |
| 2-$CH_3C_6H_4$ | 118–119 | 70.10 | 6.53 | 18.16 | 70.35 | 6.51 | 18.41 |
| 2-$CH_3OC_6H_4$ | 150–152 | 66.64 | 6.21 | 17.27 | 66.91 | 6.22 | 16.96 |
| 3,4,5-$(CH_3O)C_6H_2$ | 111–113 | 62.48 | 6.29 | 14.57 | 62.25 | 6.58 | 14.45 |
| 4-$FC_6H_4$* | 142–144 | 65.36 | 5.48 | 17.93 | 65.60 | 5.67 | 17.99 |

*Recrystallized from isopropanol. All others recrystallized from ethanol.

TABLE II

| R | Melting Point,°C | Elemental Analysis | | | | | |
|---|---|---|---|---|---|---|---|
| | | Calcd. | | | Found | | |
| | | C | H | N | C | H | N |
| 2-$FC_6H_4$* | 132–133 | 69.37 | 5.13 | 19.03 | 69.60 | 5.11 | 19.10 |
| 4-$FC_6H_4$ | 157–158 | 69.37 | 5.13 | 19.03 | 69.65 | 5.03 | 18.97 |
| 4-$CH_3C_6H_4$* | 134–135 | 74.45 | 6.24 | 19.29 | 74.55 | 6.38 | 19.42 |
| 4-$NCC_6H_4$ | 189–190 | 71.73 | 5.01 | 23.24 | 71.46 | 4.99 | 22.98 |
| 3-$BrC_6H_4$ | 186–187 | 57.47 | 4.25 | 15.77 | 57.23 | 4.49 | 15.62 |
| 4-$BrC_6H_4$ | 183–184 | 57.47 | 4.25 | 15.77 | 57.41 | 4.51 | 15.81 |
| 3,4,5-$(CH_3O)_3C_6H_2$ | 186–187 | 65.55 | 6.05 | 15.29 | 65.59 | 6.19 | 15.01 |
| 3,4-$Cl_2C_6H_3$ | 184–185 | 59.14 | 4.08 | 16.23 | 59.19 | 4.21 | 16.08 |
| $C_6H_5$* | 142–143 | 73.88 | 5.83 | 20.27 | 73.62 | 5.73 | 19.99 |

*Recrystallized from isopropanol. All others recrystallized from ethanol.

In standard pharmacological evaluation procedures, (See, e.g., U.S. Pat. Nos. 3,641,019-3,485,921) the compounds of Example 3 wherein R is 2-fluorophenyl, 3-bromophenyl or 4-fluorophenyl are found to block histamine induced contraction of isolated guinea pig trachea at a concentration of 120 milligrams per liter. The compounds of formula I wherein R is 2-fluorophenyl, 4-cyanophenyl, 4-bromophenyl, phenyl or hydrogen and are all phenyl, 4-bromophenyl, phenyl or hydrogen and of formula I wherein R is phenyl, are all found to extend hexobarbital induced sleep in mice by a factor of at least two, when the test compounds are administered intraperitoneally at 60 milligrams per kilogram 30 minutes before hexobarbital. The compounds wherein R is 3-bromophenyl or hydrogen are found to inhibit reserpine induced ptosis in mice at an equivalent dosage rate. In other operations, intraperitoneal administration of 60 mg/kg of compounds of Example 4 wherein R is hydrogen or 4-methylphenyl exhibit analgesic activity in inhibiting characteristic writhing induced in mice by intraperitoneal injection of aqueous hydrochloric acid.

The 2-aminophenyl triazine starting material can be prepared by reacting 2-aminophenyl cyanide with hydrogen sulfide in pyridine and triethylamine to obtain 2-aminophenylthiobenzamide, and then reacting the thiobenzamide with a 1-loweralkyl-1-(2-aminoethyl)-hydrazine. For example, 100 grams of 2-aminophenyl cyanide in a mixture of 500–600 milliliters of pyridine and 100 milliliters triethylamine is stirred at about 25°C. while hydrogen sulfide is passed through the mixture for three hours. The product is separated, and 4 grams of the product are mixed with 1.8–2.0 grams 1-methyl-1-(2-aminoethyl)hydrazine for 2 hours at about 100–120°C. to drive off hydrogen sulfide of reaction. Ethanol is added and the mixture is boiled for 30 minutes under reflux, cooled, diluted with ether until a precipitate forms, and filtered. The aminophenyl triazine filter cake is recrystallized from isopropanol and found to melt at 140°–141°C.

What is claimed is:

1. A 3-(2-acylaminophenyl)-1,2,4-triazine corresponding to the formula:

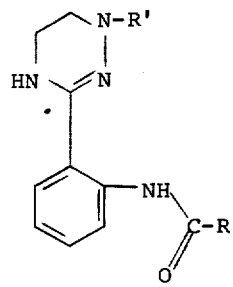

wherein R represents phenyl or substituted phenyl having one, two or three substituents selected from halo, cyano, and loweralkyl or loweralkoxy of one to three carbon atoms, and R' represents loweralkyl of one to three carbon atoms.

2. A compound of claim 1 wherein R represents phenyl or mono-substituted phenyl.

3. A compound of claim 1 wherein R' is methyl.

4. A compound of claim 3 wherein R is phenyl.

* * * * *